US012247423B2

(12) United States Patent
Wang et al.

(10) Patent No.: US 12,247,423 B2
(45) Date of Patent: Mar. 11, 2025

(54) ELECTRONIC LOCK COMPONENTS

(71) Applicant: Primax Electronics Ltd., Taipei (TW)

(72) Inventors: Li-Chun Wang, Taipei (TW); Meng-Chieh Liu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 143 days.

(21) Appl. No.: 18/107,950

(22) Filed: Feb. 9, 2023

(65) Prior Publication Data

US 2024/0191542 A1 Jun. 13, 2024

(30) Foreign Application Priority Data

Dec. 13, 2022 (TW) ................................. 111147862

(51) Int. Cl.
*E05B 9/08* (2006.01)

(52) U.S. Cl.
CPC ..................................... *E05B 9/08* (2013.01)

(58) Field of Classification Search
CPC ... E05B 9/08; E05B 9/02; E05B 9/082; E05B 2015/1664; E05B 2015/1635; E05B 2015/1657; E05B 47/0012; E05B 47/00; E05B 47/02; E05B 47/0005; E05B 15/1635; E05B 2009/0004; E05B 2009/008; E05B 3/00; E05B 3/06; E05B 2047/0091; E05B 49/00; E05B 9/00
(Continued)

(56) References Cited

U.S. PATENT DOCUMENTS 5,702,021 A * 12/1997 Ito .......................... H01R 13/60
220/780
5,970,756 A * 10/1999 Miller ................. E05B 17/2084
70/168
(Continued)

FOREIGN PATENT DOCUMENTS

CN 201176748 Y * 1/2009 ............. E05B 49/00
CN 105625807 A * 6/2016 ............. E05B 9/002
(Continued)

OTHER PUBLICATIONS

DE3722398A1 Espacenet machine translation claims and description (Year: 2024).*
EP_0090921_A1 Fit text and image merge (Year: 2024).*

*Primary Examiner* — Kristina R Fulton
*Assistant Examiner* — Steven A Tullia
(74) *Attorney, Agent, or Firm* — KIRTON McCONKIE; Evan R. Witt

(57) ABSTRACT

An electronic lock components includes a bracket configured to be mounted on a door panel and an electronic lock body configured to be assembled on or disassembled from the bracket. The bracket includes an elastic piece, and a portion of the elastic piece is inclined downward. The electronic lock body includes: a back cover body, having a through hole therethrough, in which when the back cover body is leaned against the bracket and then moved downward, one end of the portion of the elastic piece is able to be stuck in the through hole; and a main cover body, including a pushing piece having a convex portion facing the through hole, in which when the pushing piece is pushed toward the through hole, the convex portion is able to push the end of the portion of the elastic piece away from the through hole.

11 Claims, 5 Drawing Sheets

(58) Field of Classification Search
USPC .................................................... 70/275, 448
See application file for complete search history.

(56) References Cited

U.S. PATENT DOCUMENTS

| | | | | | |
|---|---|---|---|---|---|
| 6,516,569 | B2 * | 2/2003 | Schweitzer | E05B 45/06 70/DIG. 49 |
| 6,992,901 | B1 * | 1/2006 | Hung | H05K 9/0009 174/385 |
| 7,170,758 | B1 * | 1/2007 | Hanning | H02B 1/052 361/801 |
| 7,535,731 | B2 * | 5/2009 | Peng | H05K 7/142 361/801 |
| 7,772,512 | B2 * | 8/2010 | Milo | H01H 13/14 200/341 |
| 8,203,838 | B2 * | 6/2012 | Lin | H04M 1/0262 429/97 |
| 8,220,848 | B2 * | 7/2012 | Minemura | B29C 45/38 296/146.7 |
| 10,808,420 | B2 * | 10/2020 | Morstatt | E05B 17/002 |
| 10,876,331 | B2 * | 12/2020 | Wang | E05C 19/063 |
| 11,249,263 | B2 * | 2/2022 | Chen | G02B 6/4234 |
| 11,892,120 | B2 * | 2/2024 | Bacon-Brown | E05B 65/0075 |
| 11,920,372 | B2 * | 3/2024 | Uyeda | E05B 47/026 |
| 2002/0142649 | A1 * | 10/2002 | Baugh | G02B 6/4255 439/532 |
| 2011/0149487 | A1 * | 6/2011 | Lin | H04M 1/0262 361/679.01 |
| 2016/0251883 | A1 * | 9/2016 | Wang | A47L 15/4259 292/179 |
| 2023/0103238 | A1 * | 3/2023 | Liang | G06F 1/185 361/292 |
| 2023/0151642 | A1 * | 5/2023 | Lin | E05B 63/0017 70/279.1 |
| 2023/0193655 | A1 * | 6/2023 | Yu | E05B 63/0056 70/466 |
| 2024/0191542 | A1 * | 6/2024 | Wang | E05B 47/00 |
| 2024/0200361 | A1 * | 6/2024 | Wang | E05B 49/00 |

FOREIGN PATENT DOCUMENTS

| | | | | | |
|---|---|---|---|---|---|
| CN | 205297056 | U | * | 6/2016 | E05B 49/00 |
| CN | 106320818 | A | * | 1/2017 | E05B 17/20 |
| CN | 106801540 | A | * | 6/2017 | E05B 9/002 |
| CN | 206458179 | U | * | 9/2017 | E05B 47/00 |
| CN | 108798240 | A | * | 11/2018 | E05B 15/16 |
| CN | 111677375 | A | * | 9/2020 | E05B 15/00 |
| CN | 111852188 | A | * | 10/2020 | E05B 9/00 |
| CN | 211950009 | U | * | 11/2020 | E05B 65/52 |
| CN | 213297479 | U | * | 5/2021 | E05B 9/00 |
| CN | 115405166 | A | * | 11/2022 | E05B 47/0004 |
| CN | 217957541 | U | * | 12/2022 | H05K 7/14 |
| CN | 116927596 | A | * | 10/2023 | E05B 47/0012 |
| CN | 116950502 | A | * | 10/2023 | E05B 49/00 |
| CN | 117052238 | A | * | 11/2023 | E05B 15/00 |
| DE | 2815526 | B1 | * | 7/1979 | H05K 5/0013 |
| DE | 3335665 | A1 | * | 4/1985 | H05K 5/00 |
| DE | 3722398 | A1 | * | 1/1989 | H05K 5/0013 |
| DE | 4309768 | A1 | * | 9/1994 | H01F 27/027 |
| DE | 3230545 | A1 | * | 7/1999 | H05K 7/183 |
| DE | 29908345 | U1 | * | 7/1999 | H05K 7/183 |
| DE | 10103950 | C1 | * | 8/2002 | H05K 5/0013 |
| DE | 10229449 | A1 | * | 1/2003 | E05B 65/087 |
| DE | 102010038041 | A1 | * | 12/2011 | E05F 3/00 |
| DE | 102014113761 | A1 | * | 3/2016 | E05B 15/02 |
| DE | 102022124576 | A1 | * | 3/2024 | E05B 9/08 |
| EP | 0090921 | A1 | * | 10/1983 | E05C 19/06 |
| EP | 1621658 | A2 | * | 2/2006 | D06F 37/42 |
| EP | 3272975 | A1 | * | 1/2018 | E05B 15/02 |
| EP | 3643858 | A1 | * | 4/2020 | E05B 9/00 |
| EP | 3311637 | B1 | * | 4/2022 | G01R 11/24 |
| EP | 4391747 | A1 | * | 6/2024 | F16M 13/022 |
| GB | 2584101 | A | * | 11/2020 | E05B 45/06 |
| JP | 2000183549 | A | * | 6/2000 | H05K 5/02 |
| JP | 3338786 | B2 | * | 10/2002 | |
| JP | 4994214 | B2 | * | 8/2012 | H05K 5/03 |
| KR | 200330562 | Y1 | * | 10/2003 | E05B 49/00 |
| KR | 20060039712 | A | * | 5/2006 | E05B 45/06 |
| KR | 200465832 | Y1 | * | 3/2013 | E05B 9/02 |
| KR | 101594498 | B1 | * | 2/2016 | E05B 49/00 |
| KR | 101956498 | B1 | * | 3/2019 | E05B 63/0047 |
| SE | 1650222 | A1 | * | 8/2017 | E05B 9/082 |
| TW | 1715465 | B | * | 1/2021 | F16M 11/041 |
| WO | WO-2013068083 | A1 | * | 5/2013 | E05F 3/227 |
| WO | WO-2014011509 | A1 | * | 1/2014 | D06F 39/14 |
| WO | WO-2018203630 | A1 | * | 11/2018 | E05B 47/00 |
| WO | WO-2022253274 | A1 | * | 12/2022 | E05B 15/00 |

* cited by examiner

ELECTRONIC LOCK COMPONENTS

FIELD OF THE INVENTION

The present disclosure relates to an electronic lock components.

BACKGROUND OF THE INVENTION

At present, an electronic lock is usually assembled on a door lock bracket with screws or other moving parts. To remove the electronic lock, tools such as a screwdriver and tweezers are required. That is, assembly and disassembly processes of the current electronic lock is complicated and time-consuming.

SUMMARY OF THE INVENTION

The present disclosure provides electronic lock components, which includes a bracket and an electronic lock body. The bracket is configured to be mounted on a door panel. The bracket includes an elastic piece, and a portion of the elastic piece is inclined downward relative to a horizontal direction. The electronic lock body is configured to be assembled on the bracket or disassembled from the bracket. The electronic lock body includes: a back cover body, having a through hole through the back cover body, in which when the back cover body is leaned against the bracket and then moved downward, one end of the portion of the elastic piece is able to be stuck in the through hole; and a main cover body, including a pushing piece, the pushing piece having a convex portion facing the through hole, in which when the pushing piece is pushed toward the through hole, the convex portion is able to push the end of the portion of the elastic piece stuck in the through hole away from the through hole.

In some embodiments of the present disclosure, another portion of the elastic piece is in contact with the bracket.

In some embodiments of the present disclosure, the back cover body further has a recess recessed inward from a surface of the back cover body facing the bracket, and the recess communicates with the through hole, and the recess is configured to accommodate the elastic piece.

In some embodiments of the present disclosure, a surface of the recess facing the bracket and adjacent to an upper edge of the through hole is inclined.

In some embodiments of the present disclosure, the bracket further includes a hook portion connected to the bracket, and the back cover body includes a direction limiting piece separated from the through hole, and the direction limiting piece and the back cover body defines a back opening and an upper opening, and the back opening is located on a surface of the back cover body facing the bracket, and the upper opening is close to a portion of a surface of the back cover body facing away from the bracket, in which when the back cover body is leaned against the bracket and the back opening is aligned with the hook portion, the direction limiting piece covers the hook portion, and when the back cover body is then moved downward, the direction limiting piece is also moved downward, so that a portion of the hook portion is exposed from the upper opening, and another portion of the hook portion is in contact with an upper wall of the back opening.

In some embodiments of the present disclosure, the portion of the hook portion is in contact with the portion of the surface of the back cover body facing away from the bracket.

In some embodiments of the present disclosure, a shape of the portion of the hook portion is complementary to a shape of the portion of the surface of the back cover body facing away from the bracket.

In some embodiments of the present disclosure, the electronic lock components further includes: a tail piece, through the bracket; in which the electronic lock body further includes a rotating shaft located in the main cover body, and the rotating shaft has an opening, and an open end of the opening faces downward, in which when the back cover body is leaned against the bracket and then moved downward, the rotating shaft is also moved downward, so that a closed end of the opening engages with an end of the tail piece.

In some embodiments of the present disclosure, when the back cover body is leaned against the bracket, the open end of the opening is able to accommodate a portion of an end of the tail piece.

In some embodiments of the present disclosure, the back cover body further has a tail piece mounting hole through the back cover body, in which when the back cover body is leaned against the bracket, the tail piece mounting hole is able to accommodate a portion of the end of the tail piece.

In some embodiments of the present disclosure, the back cover body further has a shaft hole through the back cover body, and the shaft hole is located over and communicates with the tail piece mounting hole, and the rotating shaft is located in the shaft hole.

BRIEF DESCRIPTION OF THE DRAWINGS

Aspects of the present disclosure are best understood from the following embodiments, read in conjunction with the accompanying drawings. It should be understood, however, that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
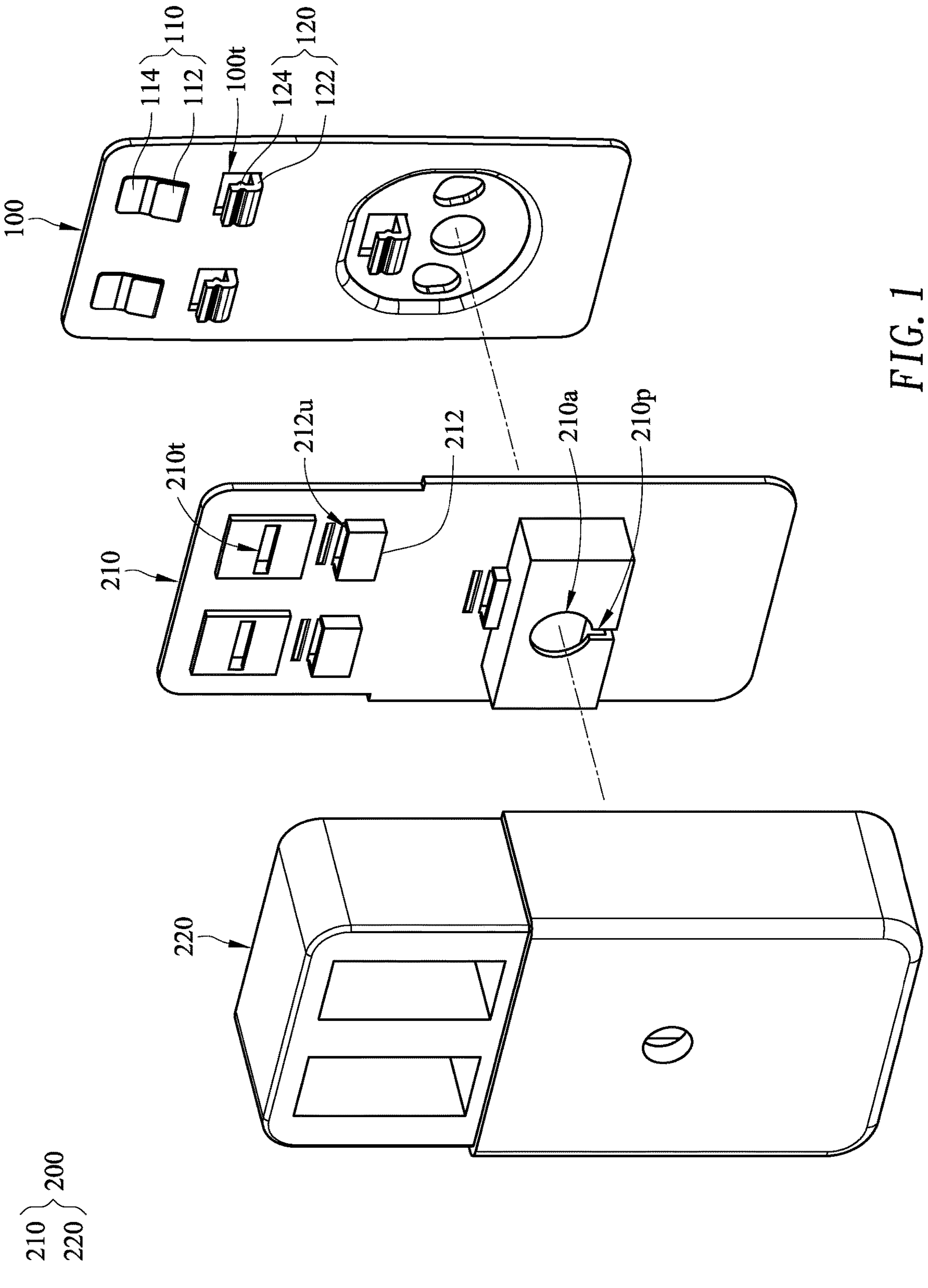
FIG. 1 is a front perspective exploded schematic diagram of a bracket and an electronic lock body according to an embodiment of the present invention.

The advantages and features of the present disclosure and the method for achieving the same will be described in more detail with reference to exemplary embodiments and the accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." In addition, the spatially relative descriptions used herein should be interpreted the same.

As described in the related art, the assembly and disassembly processes of the current electronic lock is complicated and time-consuming. Accordingly, the present invention provides electronic lock components including a bracket and an electronic lock body, and the electronic lock body of the present invention can be assembled on or disassembled from the bracket by hand by designs of an elastic piece of the bracket, a through hole of a back cover body of the electronic lock body, and a pushing piece of a main cover body of the electronic lock body, and the assembly and disassembly methods thereof are very simple, and thus the above technical issues can be solved. Various embodiments of the electronic lock components of the present invention will be described in detail below.

Figure 2:
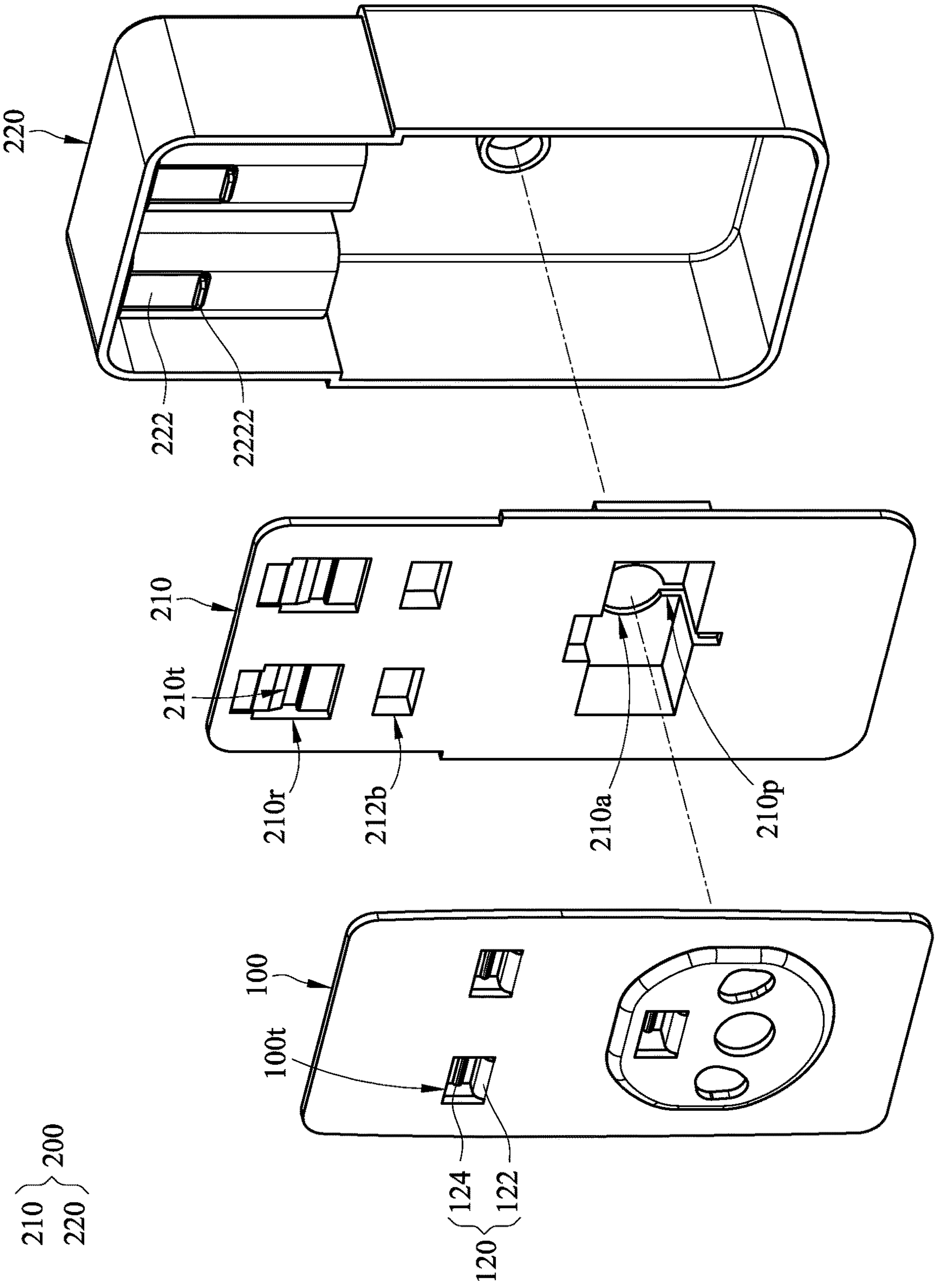
FIG. 2 is a rear perspective exploded schematic diagram of a bracket and an electronic lock body according to an embodiment of the present invention.

FIG. 1 is a front perspective exploded schematic diagram of a bracket and an electronic lock body according to an embodiment of the present invention. FIG. 2 is a rear perspective exploded schematic diagram of a bracket and an electronic lock body according to an embodiment of the present invention. As shown in FIGS. 1 to 2, the electronic lock components includes a bracket (or may be called a door lock bracket) 100 and an electronic lock body 200. In some embodiments, the electronic lock components are mounted on an interior side of the door panel, so those may be referred to as interior electronic lock components.

Figure 4:
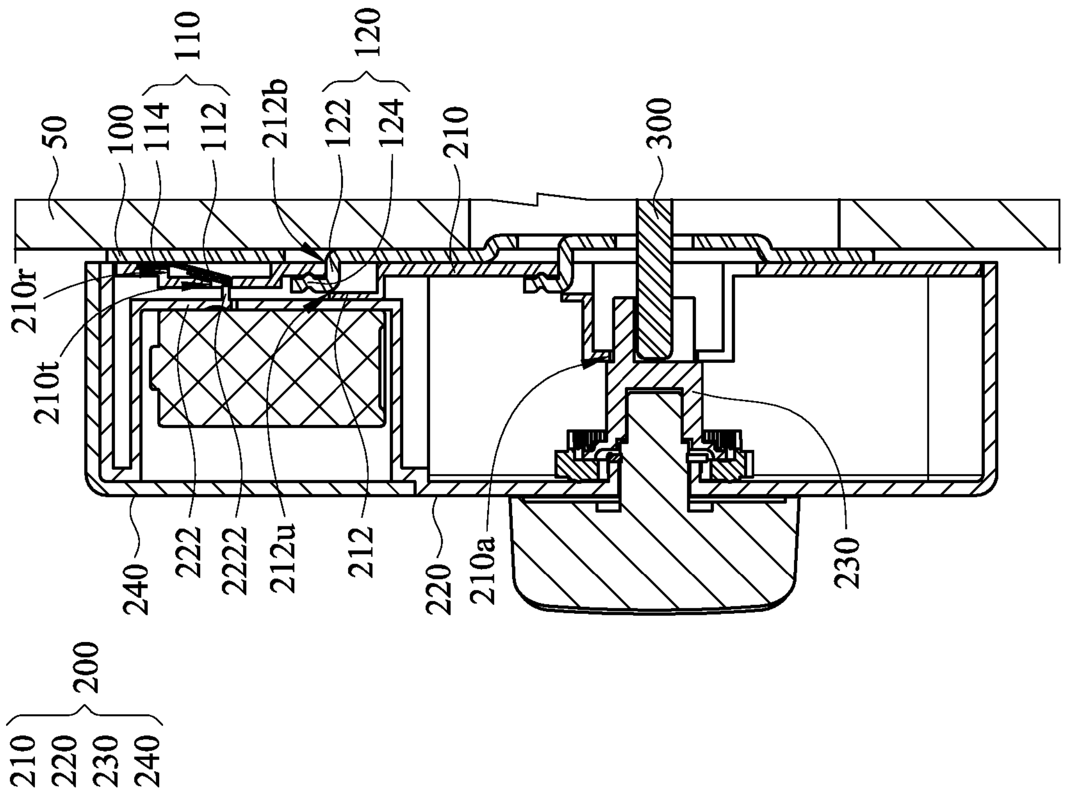
FIG. 4 is a schematic cross-sectional view of the electronic lock body in FIG. 3 after being moved downward.
Figure 3:
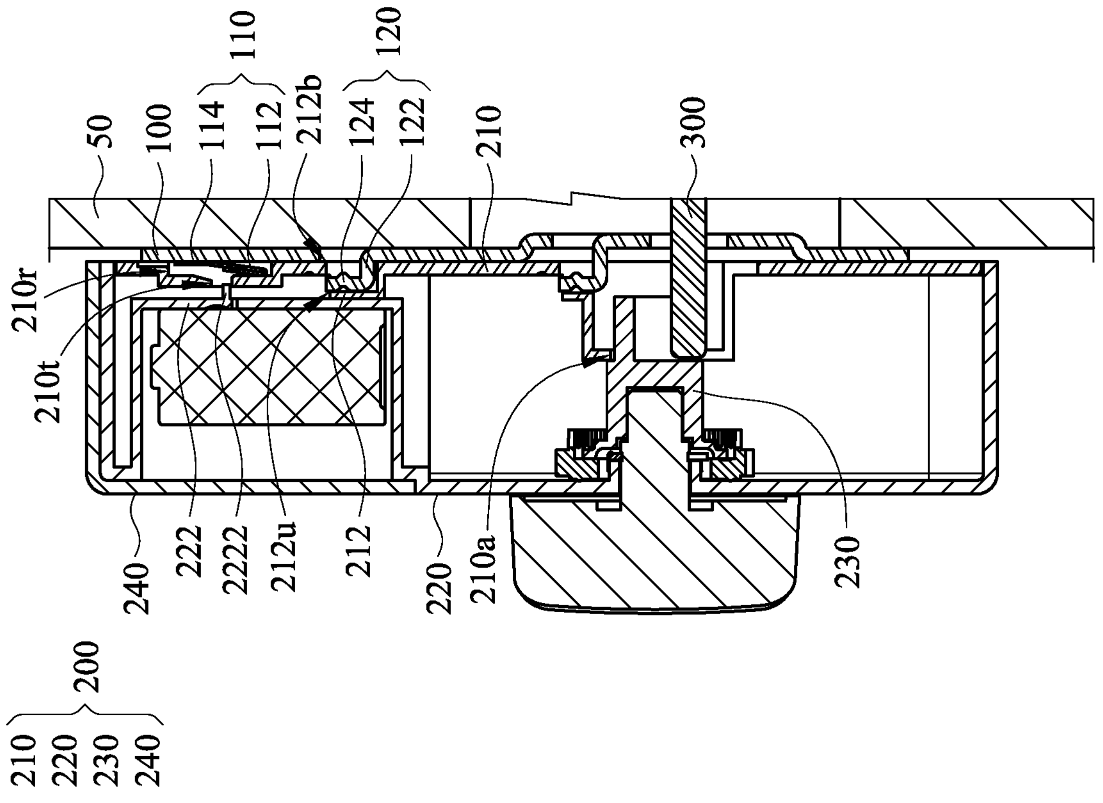
FIG. 3 is a schematic cross-sectional view of an electronic lock body leaning against a bracket according to an embodiment of the present invention.
Figure 5:
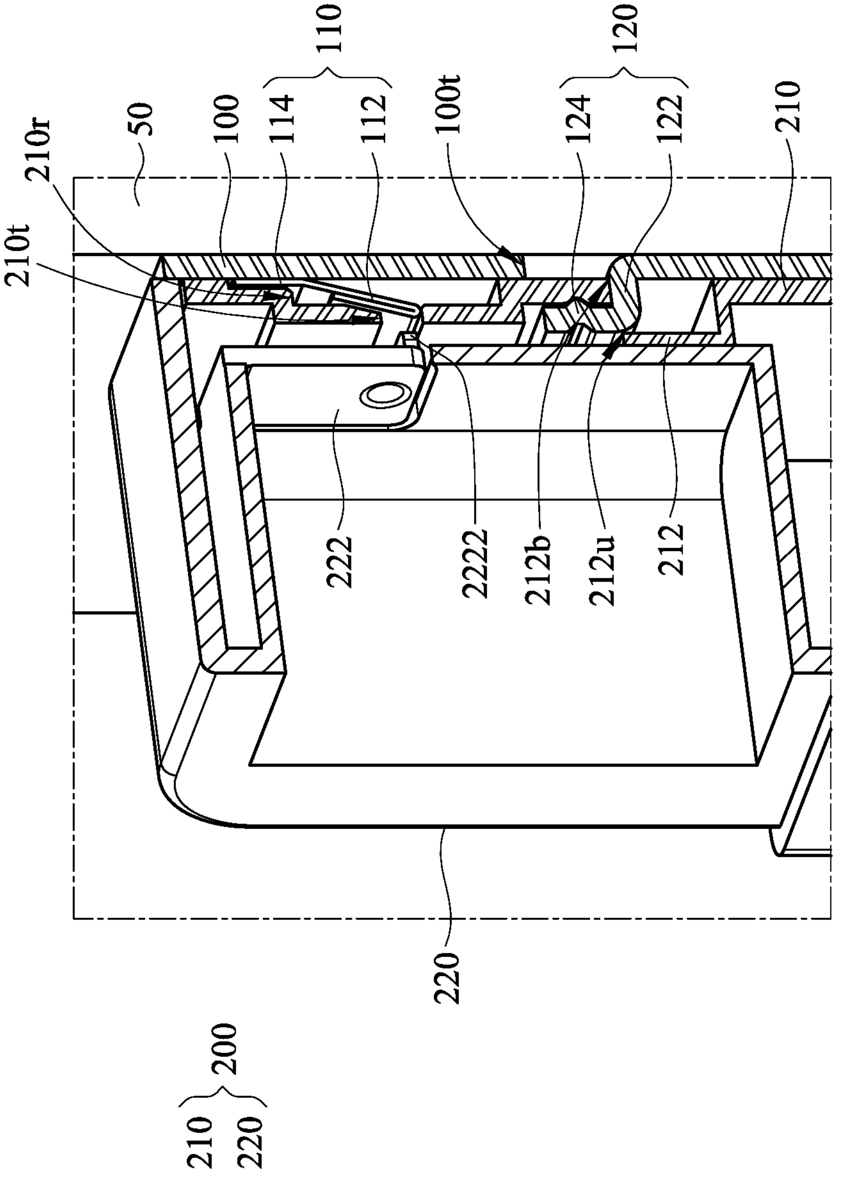
FIG. 5 is a partially enlarged perspective schematic diagram of the bracket and the electronic lock body of FIG. 4.

FIG. 3 is a schematic cross-sectional view of an electronic lock body leaning against a bracket according to an embodiment of the present invention. FIG. 4 is a schematic cross-sectional view of the electronic lock body in FIG. 3 after being moved downward. FIG. 5 is a partial enlarged perspective schematic diagram of the bracket and the electronic lock body of FIG. 4. As shown in FIGS. 3 to 5, the bracket 100 is configured to be mounted on a door panel 50. As shown in FIGS. 1 to 5, the bracket 100 includes an elastic piece 110. A portion 112 (or may be referred to as a floating end) of the elastic piece 110 is inclined downward relative to a horizontal direction (i.e., the direction perpendicular to the bracket 100). In some embodiments, as shown in FIGS. 1 and 3 to 5, another portion 114 (or may be referred to as a fixed end) of the elastic piece 110 is in contact with the bracket 100. In some embodiments, the other portion 114 of the elastic piece 110 is connected to the portion 112 of the elastic piece 110. In some embodiments, the elastic piece 110 is an elastic sheet, which may be made of metal and/or other suitable materials.

As shown in FIGS. 1 to 5, the electronic lock body 200 is configured to be assembled on the bracket 100 or disassembled from the bracket 100. The electronic lock body 200 includes a back cover body 210 and a main cover body 220.

The back cover body 210 has a through hole 210*t* through the back cover body 210. As shown in FIG. 3 and FIGS. 4 to 5, when the back cover body 210 is leaned against the bracket 100 and then moved downward, one end of the portion 112 of the elastic piece 110 is able to be stuck in the through hole 210*t*, so that the back cover body 210 cannot be moved upward. In some embodiments, when the back cover body 210 is leaned against the bracket 100 and then moved downward, the end of the portion 112 of the elastic piece 110 enters the through hole 210*t* and is in contact with a lower wall of the through hole 210*t*.

In some embodiments, as shown in FIGS. 2 and 5, the back cover body 210 further has a recess 210*r*, which is recessed inward from a surface of the back cover body 210 facing the bracket 100, and the recess 210*r* communicates with the through hole 210*t*, and the recess 210*r* is configured to accommodate the elastic piece 110. In some embodiments, as shown in FIGS. 3 to 5, a surface of the recess 210*r* facing the bracket 100 and adjacent to an upper edge of the through hole 210*t* is inclined to prevent the end of the portion 112 of the elastic piece 110 from being hindered during entering the through hole 210*t*.

As shown in FIGS. 2 to 5, the main cover body 220 includes a pushing piece 222, and the pushing piece 222 has a convex portion 2222, which faces the through hole 210*t*. In some embodiments, as shown in FIG. 5, the convex portion 2222 is able to be substantially aligned with the end of the portion 112 of the elastic piece 110. As shown in FIGS. 4 to 5, when the pushing piece 222 is pushed toward the through hole 210*t*, the convex portion 2222 is able to push the end of the portion 112 of the elastic piece 110 stuck in the through hole 210*t* away from the through hole 210*t*.

In some embodiments, as shown in FIGS. 3 and 4, the electronic lock body 200 further includes a rotating shaft 230 inside the main cover body 220. In some embodiments, the electronic lock body 200 further includes a knob (not marked) connected to the rotating shaft 230. In some embodiments, the electronic lock body 200 further includes an upper cover 240 covering a portion of the main cover body 220. The upper cover 240 may be, for example, a battery cover.

The following describes the assembly method of the electronic lock body 200 of the present invention. Please refer to FIG. 3 and FIGS. 4 to 5, personnel can lean the electronic lock body 200 (which includes the back cover body 210 and the main cover body 220, and may further include the rotating shaft 230 and/or the upper cover 240) against the bracket 100 and move it downward by hand, and thus the end of the portion 112 of the elastic piece 110 enters the through hole 210*t* and is stuck in the through hole 210*t* at this time, so that the back cover body 210 cannot be moved upward.

The disassembly method of the electronic lock body 200 of the present invention is described below. Please refer to FIGS. 4 to 5 and FIG. 3, personnel can push the pushing piece 222 toward the through hole 210*t*, and the convex portion 2222 pushes the end of the portion 112 of the elastic piece 110 stuck in the through hole 210*t* away from the through hole at this time, so that the back cover body 210 can be moved upward, so personnel can move the entire electronic lock body 200 upward by hand.

The above assembly and disassembly processes do not require any additional tools. Compared with the electronic lock of the related art, the electronic lock components of the present invention can be quickly assembled and disassembled by hand, and the assembly and disassembly methods are very simple.

In some embodiments, as shown in FIGS. 1 to 5, the bracket 100 further includes a hook portion 120 connected to the bracket 100 and separated from the elastic piece 110. In some embodiments, the back cover body 210 includes a direction limiting piece 212, which is separated from the through hole 210*t*. The direction limiting piece 212 and the back cover body 210 define a back opening 212*b* and an upper opening 212*u*. The back opening 212*b* is located on a surface of the back cover body 210 facing the bracket 100, and the upper opening 212*u* is close to a portion of the surface of the back cover body 210 facing away from the bracket 100.

In some embodiments, as shown in FIGS. 1 to 5, the hook portion 120 includes a horizontal portion 122 and a vertical portion 124, and the horizontal portion 122 is connected between the bracket 100 and the vertical portion 124. In some embodiments, as shown in FIGS. 1 and 2, the bracket 100 has an opening 100*t*, and the horizontal portion 122 is connected between a lower wall of the opening 100*t* and the vertical portion 124. In some embodiments, as shown in FIG. 3, when the back cover body 210 is leaned against the bracket 100 and the back opening 212*b* is aligned with the hook portion 120, the direction limiting piece 212 covers the hook portion 120; next, as shown in FIG. 3 and FIGS. 4 to 5, when the back cover body 210 is moved downward, the direction limiting piece 212 is also moved downward, so that a portion (e.g., the vertical portion 124) of the hook portion 120 is exposed from the upper opening 212*u*, and another portion (e.g., at least one portion of the horizontal portion 122) of the hook portion 120 is in contact with an upper wall of the back opening 212*b*. As shown in FIGS. 4 and 5, since the other portion (e.g., the at least one portion of the horizontal portion 122) of the hook portion 120 is in contact with (or can be called against) the upper wall of the back opening 212*b*, the back cover body 210 cannot be moved downward.

In some embodiments, as shown in FIGS. 4 to 5, the portion (e.g., the vertical portion 124) of the hook portion 120 exposed from the upper opening 212*u* is in contact with the portion of the surface of the back cover body 210 facing away from the bracket 100, so that the back cover body 210 cannot be moved forward, that is, the back cover body 210 cannot move away from the door panel 50. In some embodiments, a shape of the portion (e.g., the vertical portion 124) of the hook portion 120 is complementary to a shape of the portion of the surface of the back cover body 210 facing away from the bracket 100, so that paragraph sense is produced when the electronic lock body 200 is assembled.

Figure 7:
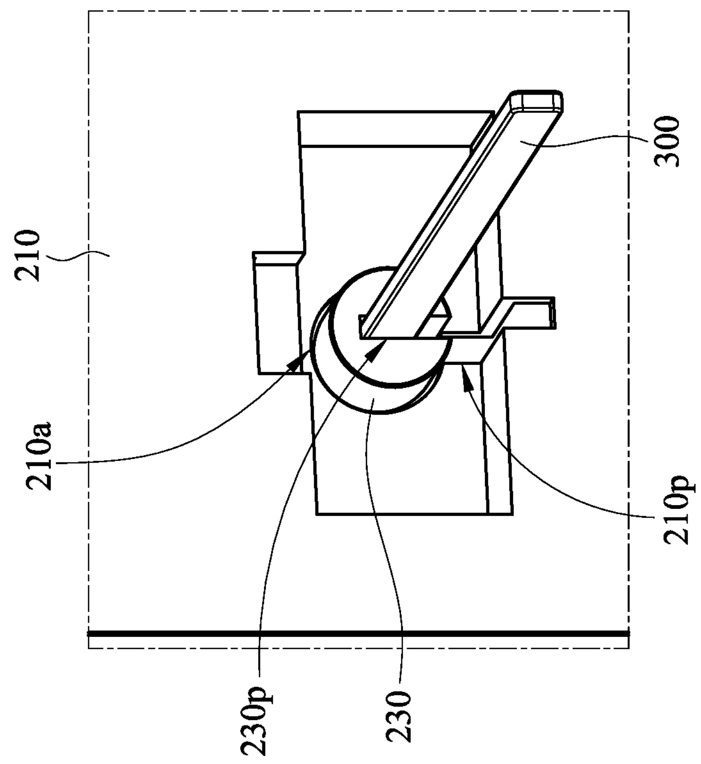
FIG. 7 is a rear perspective schematic diagram of a rotating shaft and a tail piece in FIG. 4.
Figure 6:
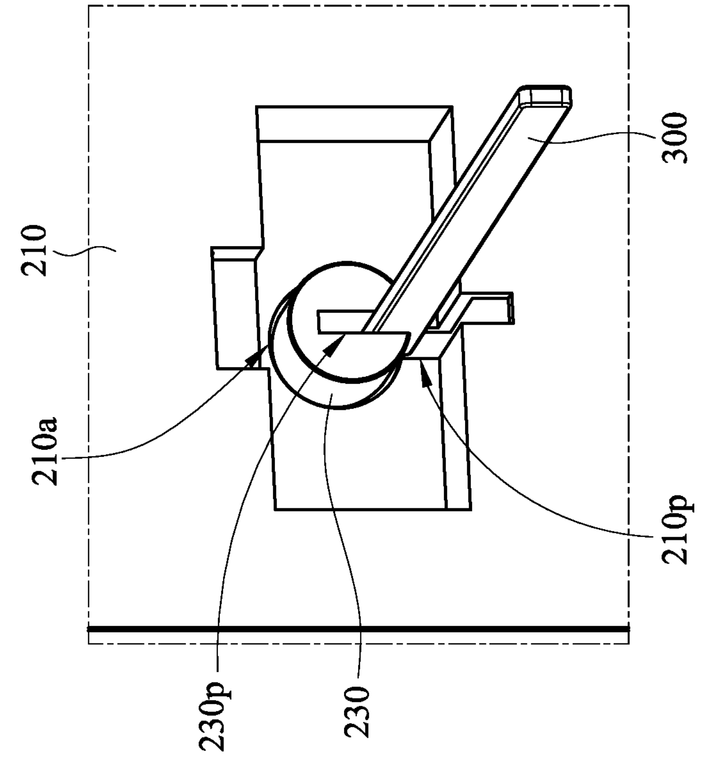
FIG. 6 is a rear perspective schematic diagram of a rotating shaft and a tail piece in FIG. 3.

In some embodiments, as shown in FIGS. 3 and 4, the electronic lock components further includes a tail piece 300 through the bracket 100. FIG. 6 is a rear perspective schematic diagram of a rotating shaft and a tail piece in FIG. 3. FIG. 7 is a rear perspective schematic diagram of a rotating shaft and a tail piece in FIG. 4. In some embodiments, as shown in FIGS. 6 and 7, the rotating shaft 230 has an opening 230*p*, and the opening 230*p* has an open end (not shown) and a closed end (not shown), and the open end is located beneath the closed end, and the open end faces downward. When the back cover body is leaned against the bracket and then moved downward, the rotating shaft 230 is also moved downward, so that the closed end of the opening 230*p* engages an end of the tail piece 300. In some embodiments, as shown in FIG. 6, the open end of the opening 230*p* is able to accommodate a portion of the end of the tail piece 300 when the back cover body 210 is leaned against the bracket 100.

In some embodiments, as shown in FIGS. 1, 2, 6 and 7, the back cover body 210 further has a tail piece mounting hole 210*p* through the back cover body 210. In some embodiments, as shown in FIG. 6, the tail piece mounting hole 210*p* is able to accommodate a portion of the end of the tail piece 300 when the back cover body 210 is leaned against the bracket 100.

In some embodiments, as shown in FIGS. 1 to 4, 6 and 7, the back cover body 210 further has a shaft hole 210*a* through the back cover body 210, and the shaft hole 210*a* is located over and communicates with the tail piece mounting hole 210*p*, and the rotating shaft 230 is located in the shaft hole 210*a*.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not used to limit the scope of claims of the present disclosure.

What is claimed is:

1. An electronic lock components, comprising:

a bracket, configured to be mounted on a door panel, the bracket including:

an elastic piece, a floating portion of the elastic piece extending inclined downward relative to a horizontal direction and adjacent to a front surface of the bracket, and a fixed portion of the elastic piece being over and connected to the floating portion and in contact with the front surface of the bracket;

an electronic lock body, configured to be assembled on the bracket or disassembled from the bracket, the electronic lock body including:

a back cover body, having a through hole through the back cover body, wherein when the back cover body is leaned against the bracket, the floating portion of the elastic piece is pressed toward the front surface of the bracket by a back surface of the back cover body facing the bracket, and when the back cover body is then moved downward, the floating portion of the elastic piece is released to allow one end of the floating portion of the elastic piece to stick in the through hole;

a main cover body, including a pushing piece, the pushing piece having a convex portion facing the through hole, wherein when the pushing piece is pushed toward the through hole, the convex portion is able to push the end of the portion of the elastic piece stuck in the through hole away from the through hole; and a rotating shaft, located in the main cover body and having an opening, wherein an open end of the opening faces downward; and a tail piece, through the bracket, wherein when the back cover body is leaned against the bracket and then moved downward, the rotating shaft is also moved downward, so that a closed end of the opening engages with an end of the tail piece.

2. The electronic lock components of claim 1, wherein the back cover body further has a recess recessed inward from the back surface of the back cover body facing the bracket, and the recess communicates with the through hole, and the recess is configured to accommodate the elastic piece.

3. The electronic lock components of claim 2, wherein a surface of the recess facing the bracket and connected to an upper edge of the through hole is inclined.

4. The electronic lock components of claim 2, wherein a depth of the recess is less than a maximum distance between the front surface of the bracket and the floating portion of the elastic piece which is not pressed.

5. The electronic lock components of claim 2, wherein when the back cover body is leaned against the bracket, the floating portion of the elastic piece is pressed toward the front surface of the bracket by a portion of the recess beneath the through hole.

6. The electronic lock components of claim 1, wherein the bracket further includes a hook portion connected to the bracket and separated from the elastic piece, and the back cover body includes a direction limiting piece separated from the through hole, and the direction limiting piece and the back cover body defines a back opening and an upper opening connected to the back opening, and the back opening is located on the back surface of the back cover body facing the bracket, and the upper opening is close to a portion of a surface of the back cover body facing away from the bracket, wherein when the back cover body is leaned against the bracket and the back opening is aligned with the hook portion, the hook portion is through the back opening defined by the direction limiting piece, and when the back cover body is then moved downward, the direction limiting piece is also moved downward, so that a first portion of the hook portion is exposed from the upper opening, and a second portion of the hook portion beneath the first portion of the hook portion is in contact with an upper wall of the back opening.

7. The electronic lock components of claim 6, wherein the first portion of the hook portion is in contact with the portion of the surface of the back cover body facing away from the bracket.

8. The electronic lock components of claim 7, wherein a shape of the first portion of the hook portion is complementary to a shape of the portion of the surface of the back cover body facing away from the bracket.

9. The electronic lock components of claim 1, wherein when the back cover body is leaned against the bracket, the open end of the opening is able to accommodate a portion of the end of the tail piece.

10. The electronic lock components of claim 1, wherein the back cover body further has a tail piece mounting hole through the back cover body, wherein when the back cover body is leaned against the bracket, the tail piece mounting hole is able to accommodate a portion of the end of the tail piece.

11. The electronic lock components of claim 10, wherein the back cover body further has a shaft hole through the back cover body, and the shaft hole is located over and communicates with the tail piece mounting hole, and the rotating shaft is located in the shaft hole.

* * * * *